Patented May 26, 1936

2,041,856

UNITED STATES PATENT OFFICE 2,041,856

METHOD OF ACETYLATING DIPHENOL ISATIN

John W. Orelup, Summit, N. J.

No Drawing. Application July 14, 1932, Serial No. 622,481

5 Claims. (Cl. 260—48)

My present invention relates to improvements in methods of acetylating diphenol isatin to produce the diacetyl compound. Previously, various methods of acetylation of diphenol isatin have been proposed but so far as I am aware all have involved acetylation in non-aqueous solvents and heating for varying lengths of time. When using acetic anhydride as the acetylating agent it further has been proposed to employ it in large excess whereby this agent acts as a solvent for the diphenol isatin and to carry out the acetylation while heating below 100° C. See for instance U. S. A. patent to Preiswerk No. 1,624,675. Later, in his German Patent No. 447,539, Preiswerk proposes higher temperatures, i. e., 120 to 130° C., still using a large excess of acetic acid anhydride.

I have now found that diphenol isatin is easily and smoothly acetylated in an aqueous alkali solution at low temperatures using only a slight excess acetic anhydride, and that upon observing the conditions set forth below a practically theoretical yield of diacetyl diphenol isatin is obtained. A specific example of my improved method follows:

109 grams diphenol isatin are dissolved in 75 grams sodium hydroxide and 250 cc. of water; the cooled solution is poured on 1 kilogram of ice. 141 grams of 90% acetic anhydride are now added to the ice mixture while stirring rapidly. After a few minutes the diacetyl diphenol isatin precipitates out as a white precipitate. The temperature is then from 0 to —5° C. The reaction mixture is carefully adjusted at the end with either alkali or acetic anhydride so that the mixture is on the slightly acid side of neutral. Otherwise, the action of remaining free caustic soda if present would be to slowly saponify the diacetyl diphenol isatin. After stirring 15 to 30 minutes the whole is filtered and the precipitate is washed well with water. The yield is 145 grams of crude technical diacetyl diphenol isatin. The dry crude product is recrystallized once from 1400 grams of glacial acetic acid. The melting point of the product thus obtained is 242 to 242.5° C. It is in the form of white crystals and is of pharmaceutical purity. By precipitating the glacial acetic acid filtrate with water, small amounts of mono acetyl diphenol isatin are obtained, which can be put back into the process and reacetylated to diacetyl diphenol isatin. By keeping the temperature low, the hydrolysis of the acetic anhydride to acetic acid prior to acetylation is substantially prevented. The amount of alkali used is in excess of that required to dissolve the diphenol isatin in order to neutralize the acetic acid formed by reaction of the acetic anhydride. Otherwise, the acidified solution would cause precipitation of the diphenol isatin which would thereby escape acetylation.

Upon comparing my method with those of the prior art it will be seen that much smaller amounts of acetic anhydride are used, and since during the reaction the solution is either alkaline or very slightly acid, the reaction may be carried out in wooden tubs in place of expensive, acid-proof, enameled apparatus. The use of an aqueous medium in which to carry out the reaction instead of organic solvents which include acetic anhydride itself is also of decided advantage. The reaction, moreover, is practically instantaneous.

It will be obvious to those skilled in the art that various departures may be made in the specific example above given without departing from the principle of my invention herein set forth.

I claim:

1. The process of acetylating diphenol isatin to form the diacetyl compound, which consists in dissolving diphenol isatin in an equeous alkali solution and then adding acetic anhydride while maintaining the temperature sufficiently low to prevent substantial hydrolysis of the acetic anhydride prior to acetylation.

2. The process of acetylating diphenol isatin to form the diacetyl compound which consists in adding acetic anhydride to a solution of diphenol isatin in aqueous alkali solution under conditions including that of temperature, preventing substantial hydrolysis of the acetic anhydride and after the reaction has taken place rendering the solution substantially neutral.

3. The process of acetylating diphenol isatin to form the diacetyl compound, which consists in dissolving diphenol isatin in an excess of aqueous alkali solution, and then while maintaining a temperature of the solution at approximately 0° C. adding acetic anhydride in sufficient quantity to carry out the acetylation.

4. The process according to claim 1, recrystallizing the crude diacetyl diphenol isatin from glacial acetic acid and then recovering small amounts of mono acetyl isatin by precipitation thereof with water.

5. The process of acetylating diphenol isatin to form the diacetyl compound which consists in carrying out the acetylation with acetic anhydride in an equeous alkaline solution at a temperature low enough to prevent substantial hydrolysis of the acetic anhydride prior to acetylation and in the presence of sufficient excess alkali to neutralize substantially the acetic acid set free during acetylation.

JOHN W. ORELUP.